United States Patent
Lee

(10) Patent No.: US 7,274,801 B2
(45) Date of Patent: Sep. 25, 2007

(54) AUTOMATIC TARGET RECOGNITION SYSTEM WITH ELLIPTICAL LAPLACIAN PYRAMID FILTER

(75) Inventor: Harry C. Lee, Maitland, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 778 days.

(21) Appl. No.: 10/355,124

(22) Filed: Jan. 31, 2003

(65) Prior Publication Data

US 2004/0151343 A1   Aug. 5, 2004

(51) Int. Cl.
*G06K 9/06* (2006.01)

(52) U.S. Cl. ............ 382/103; 382/191; 382/206; 382/205; 348/169

(58) Field of Classification Search ........ 382/103, 382/104, 115–118, 181, 190, 191, 195, 203–206, 382/209, 210, 266, 288; 348/169
See application file for complete search history.

(56) References Cited

U.S. PATENT DOCUMENTS 6,516,087 B1 * 2/2003 Camus .................. 382/154

6,801,645 B1 * 10/2004 Collins et al. ............. 382/130

OTHER PUBLICATIONS

Jackson, Scott A., Ahuja, Narendra; "Elliptical Gaussian Filters"; IEEE; 1996.*
Serafim, Antonio F. Limas; "Object Detection in Images of Natural Scenes Represented by AR Models Using Laplacian Pyramids: Application to Leather Defects Localization"; IEEE; 1992.*
Burt, Peter J., Adelson, Edward H.; "The Laplacian Pyramid as a Compact Image Code"; IEEE Transactions on Communciations, vol. COM-31, No. 4, Apr. 1983.*

* cited by examiner

*Primary Examiner*—Matthew C. Bella
*Assistant Examiner*—Shefali Patel
(74) *Attorney, Agent, or Firm*—Buchanan Ingersoll & Rooney PC

(57) ABSTRACT

Automatic target recognition system and/or method which employs an elliptical Laplacian pyramid based pre-screen image data filter. The filter is a resolution sequence matched filter, where the elliptical Laplacian operator reflects the size, spatial characteristics and image intensity level of prospective, candidate targets embedded in the image data. Targets which exhibit a rectangular or elliptical shape at various aspect angles are more therefore more effectively and efficiently identified and located.

18 Claims, 11 Drawing Sheets

AUTOMATIC TARGET RECOGNITION SYSTEM WITH ELLIPTICAL LAPLACIAN PYRAMID FILTER

BACKGROUND OF THE INVENTION

1. Field of the Invention

The present invention relates to target recognition. More particularly, the present invention relates to automatic target recognition systems which employ a filter to pre-screen image data and nominate candidate targets.

2. Background Information

Weapon system performance, and in particular, military weapon system performance is generally measured in terms of system accuracy. In weapon delivery systems, accuracy may depend on the system's ability to deliver a weapon on target. In weapon systems that track targets, accuracy typically depends on the ability to periodically or continuously establish the correct position of a target. To improve accuracy, these systems often employ automatic target recognition systems and/or techniques.

Automatic target recognition generally involves processing large quantities of image data (e.g., thermal image data) in order to identify and locate candidate targets. Automatic target recognition system performance, in turn, is generally measured in terms of probability of detection ($P_d$) and probability of false detection ($P_{fd}$), where $P_d$ represents the likelihood that the system correctly detected and classified a target as a true target, and where $P_{fd}$ represents the likelihood that the system incorrectly classified a non-target as a true target. Curve A in FIG. 1 illustrates the relationship between $P_d$ and $P_{fd}$ for a typical automatic target recognition system. Clearly, it is more desirable to have a system which maximizes $P_d$ while minimizing $P_{fd}$, as indicated by the dotted line to the left of curve A, as compared to the dashed line to the right of curve A.

Conventional target recognition systems employ what is known as pipeline processing to maximize performance. Pipeline processing is a well-known term which refers to a data processing technique that involves multiple, concurrently operating processing stages, where each stage performs a separate processing function.

FIG. 2 illustrates an exemplary pipeline processing sequence 200 which might be employed in a conventional target recognition system. As shown, the exemplary pipeline processing sequence includes a pre-screen filter 205, a target delineator 210, a feature extractor 215 and a target classifier 220. The pre-screen filter 205 processes the image data and, based on this processing, identifies candidate targets. Typically, the pre-screen filter 205 also provides a location of each candidate target identified within the image, e.g., by providing an x-y coordinate of a pixel that corresponds with the spatial center of each candidate target. The target delineator 210 then uses the image data and the location information to determine the extent or boundary of any candidate target. For instance, the target delineator 210 may determine which pixels in proximity to the spatial center of a given candidate target also reflect or correspond to a portion of the candidate target. The feature extractor 215, as the name suggests, measures certain predefined target features, such as length, width, perimeter and texture. The feature extractor 215 uses the measurements to generate a vector for the candidate target. The vector is then passed to the target classifier 220. The target classifier 220, which has been previously trained using measurements of features from known true targets and known false targets, classifies the candidate target as a true target or a non-true target based on the vector it received from the feature extractor 215.

The pre-screen filter stage 205 illustrated in FIG. 2 is of particular importance. As stated, it identifies and locates candidate targets. As such, it establishes the processing load for the remaining stages. If the filter nominates a large number of candidate targets, the processing load is relatively large. If the filter nominates a small number of candidate targets, the processing load is relatively small. Therefore, it is important to employ a filter that effectively nominates targets, that is, with a relatively high $P_d$ and a relatively low $P_{fd}$. Else, a significant amount of time is wasted processing data associated with false targets. It is also important to employ a filter that efficiently processes image data so that candidate targets are nominated in a timely manner.

SUMMARY OF THE INVENTION

The present invention is directed to an automatic target recognition system and/or method, where the pre-screen filter stage of the pipeline processing sequence is implemented using an Elliptical Laplacian Pyramid (ELP) based algorithm. A Laplacian is a mathematical function which may be generated using a technique known as the Difference of Gaussians, as explained in greater detail below. As such, a Laplacian is sometimes referred to as a Difference of Gaussians (DOG). If the Gaussians are circular, so to is the resulting Laplacian. An elliptical Laplacian, as the name suggests, may be generated by a difference of two elliptical Gaussians. Thus, an elliptical Laplacian may be referred to as the Elliptical Difference of Gaussians (EDOG).

The ELP based algorithm is a resolution sequence matched filter that capitalizes on the spatial nature of targets, which tend to exhibit a rectangular and/or elliptical shape at most aspect angles. Consequently, the algorithm efficiently and effectively identifies and locates candidate targets. This, in turn, helps to insure a relatively high $P_d$:$P_{fd}$ ratio.

Accordingly, it is an object of the present invention to provide an automatic target recognition system that is capable of efficiently and effectively identifying candidate targets based on image data.

Another object of the present invention is to provide an automatic target recognition system that is capable of efficiently and effectively nominating candidate targets based on image data regardless of target range.

Still another object of the present invention is to provide an automatic target recognition system that is capable of efficiently and effectively nominating candidate targets based on image data regardless of aspect angle.

In accordance with a first embodiment of the present invention, the aforementioned and other objectives are achieved by a method for identifying an object in an image. The method involves processing the image with an elliptical Laplacian operator and locating a peak value in the processed image. The object is then identified as a function of the peak value.

In accordance with another embodiment of the present invention, the aforementioned and other objectives are achieved by a method for locating a target in an image. The method involves processing pixel data associated with the image through the use of an elliptical Laplacian operator. A vector is then generated, where the vector comprises a set of resultant values based on the previous step of processing the pixel data. From the set of resultant values, a peak value is identified, and therefrom, the target is located as a function of a pixel location corresponding with the identified peak value.

In accordance with yet another embodiment of the present invention, the aforementioned and other objectives are achieved through a target recognition system. The system includes means for receiving data associated with an image. The system also includes an elliptical Laplacian based pre-screen filter, which processes the image data and identifies therein a candidate target.

BRIEF DESCRIPTION OF THE DRAWINGS

Other objects and advantages of the present invention will become apparent to those skilled in the art from the following detailed description when read in conjunction with the accompanying drawings wherein.

DETAILED DESCRIPTION OF THE PREFERRED EMBODIMENTS

To facilitate a better understanding of the present invention, the present invention is described herein below with references to military type weapon systems. However, it will be understood that the present invention may apply to any system, military or otherwise, that requires efficient and effective recognition of targets, or more generally, objects embedded in image data.

Figure 1:
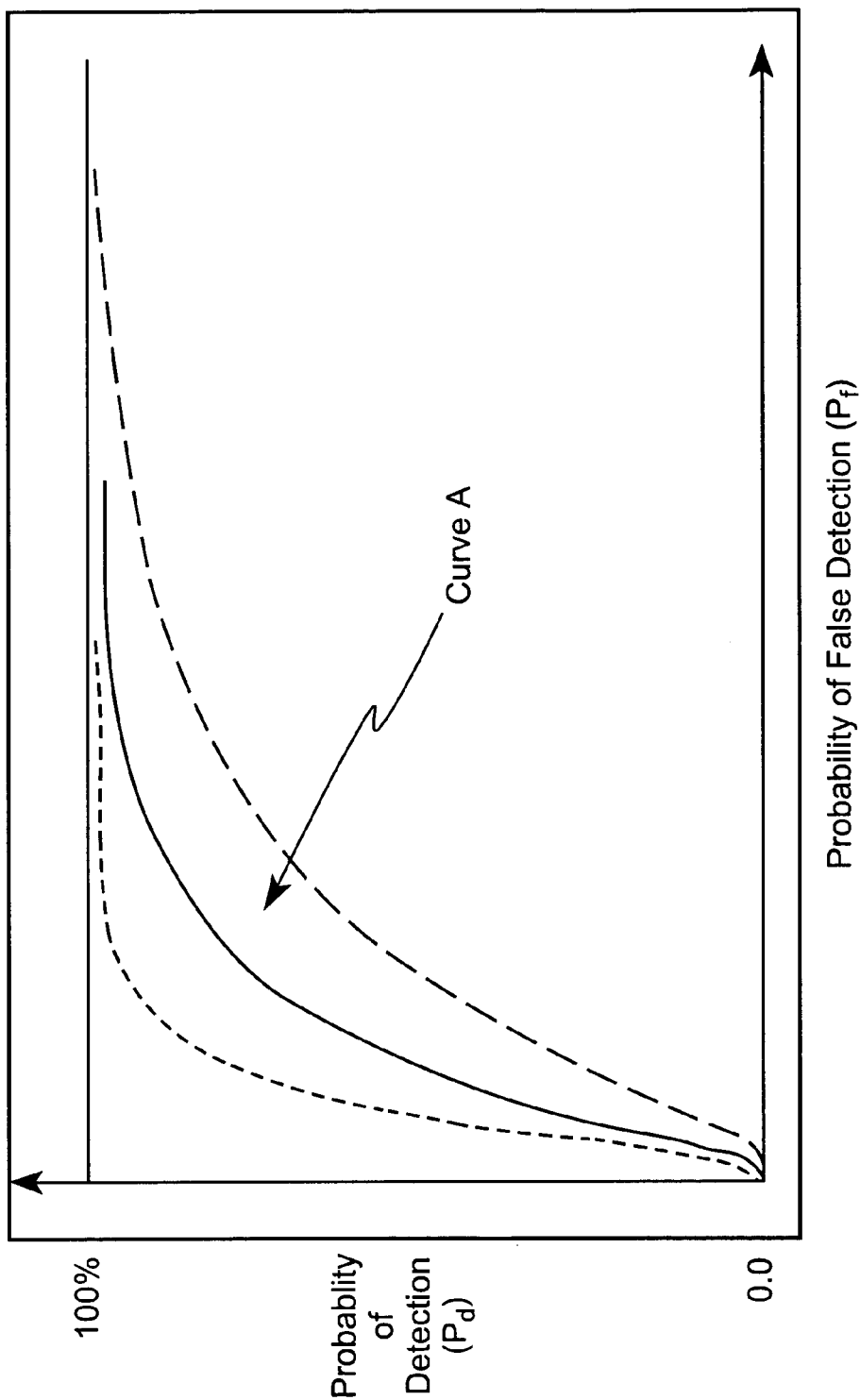
FIG. 1 is a graph which illustrates the relationship between $P_d$ and $P_{fa}$ in a typical automatic target recognition system.
Figure 2:
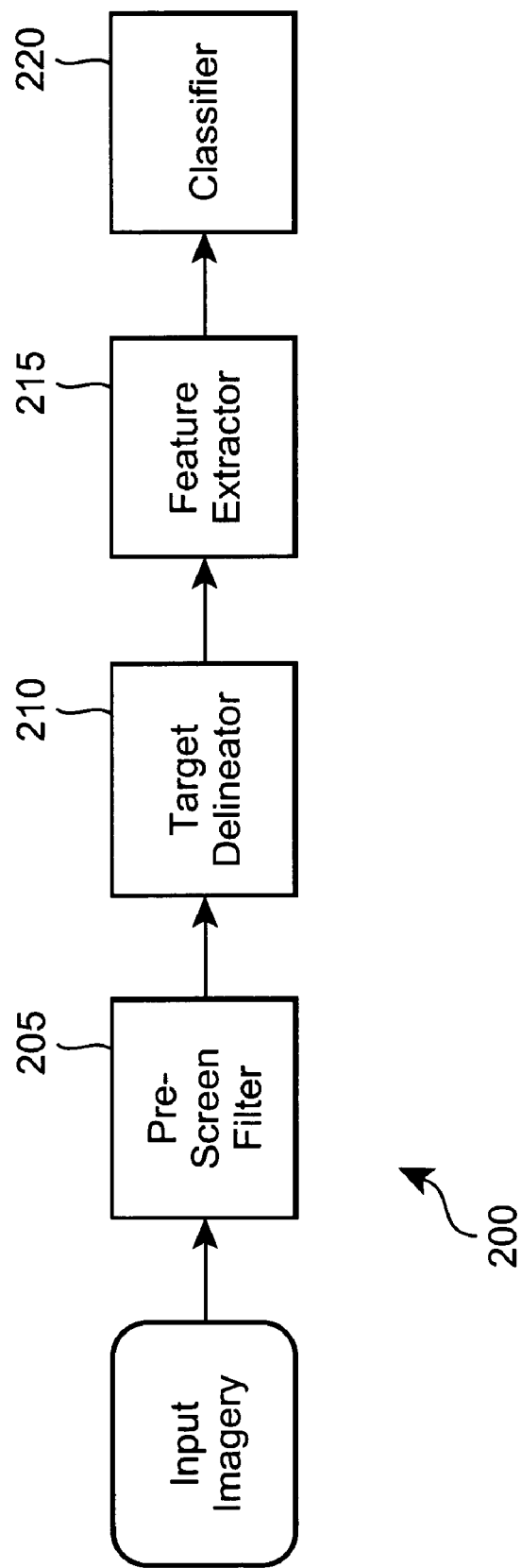
FIG. 2 is a block diagram which illustrates the processing stages associated with an exemplary pipeline processing sequence employed in a typical target recognition system.
Figure 3:
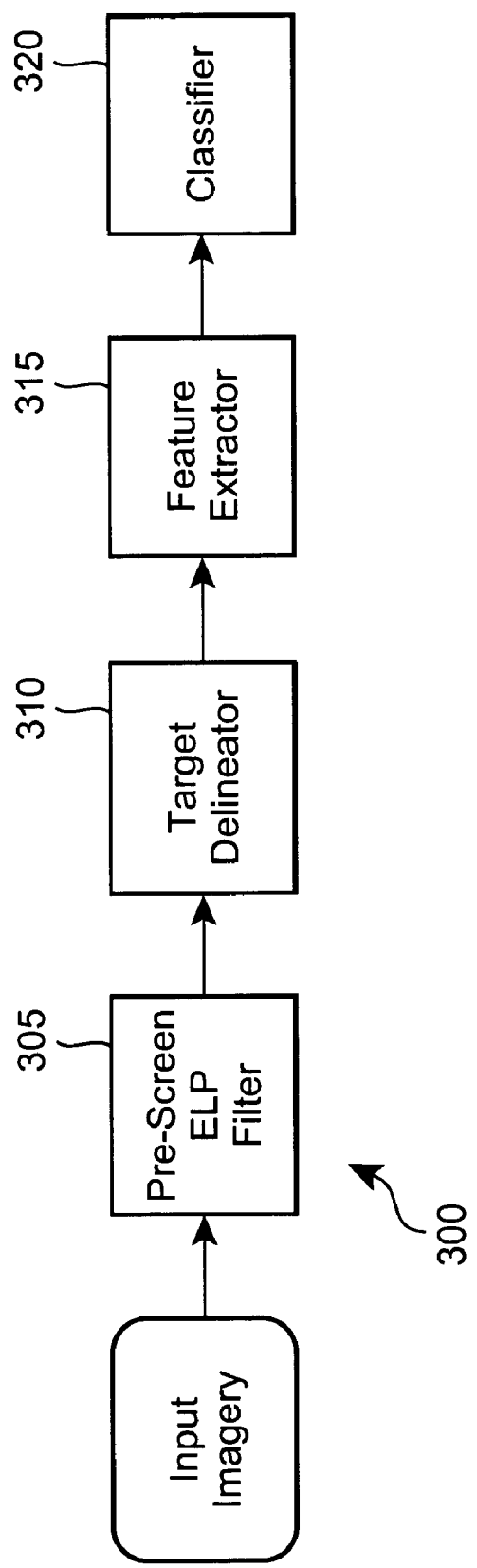
FIG. 3 is a block diagram which illustrates the processing stages associated with a pipeline processing sequence that may be employed in a target recognition system according to exemplary embodiments of the present invention.

FIG. 3 depicts a pipeline processing sequence 300. Like the pipeline processing sequence depicted in FIG. 2, the pipeline processing sequence 300 includes a pre-screen filter 305, a target delineator 310, a feature extractor 315 and a target classifier 320. Unlike the pipeline processing sequence 200, the pre-screen filter 305 is, according to exemplary embodiments of the present invention, implemented using an ELP based algorithm. The ELP based algorithm employs elliptical Laplacian operators which closely reflect the spatial characteristics of prospective targets, such as trucks, tanks, missile sites and the like, to identify and locate these targets in the image data.

Figure 4:
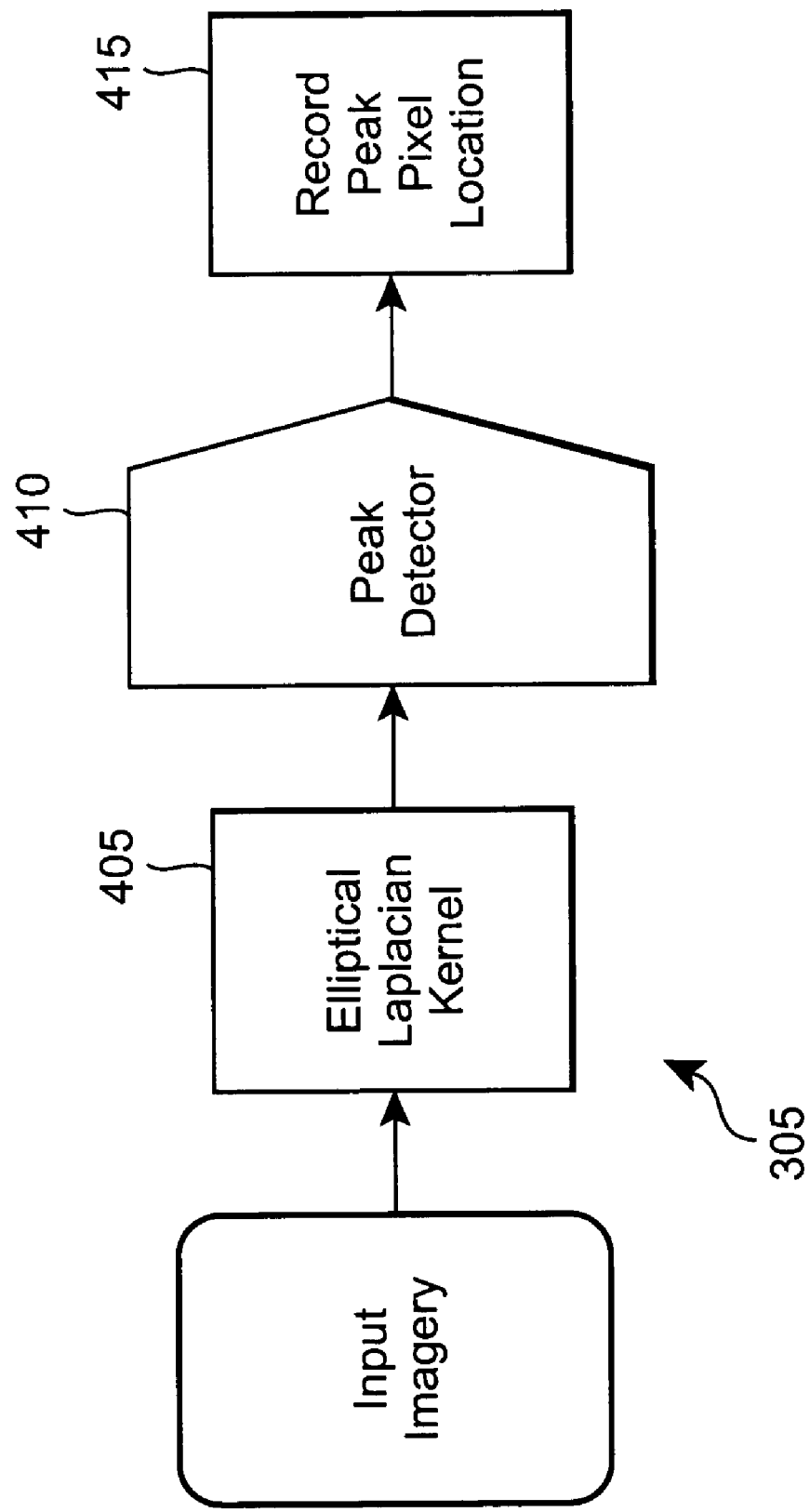
FIG. 4 is a block diagram which illustrates the processing functions associated with the ELP based pre-screen filter algorithm according to exemplary embodiments of the present invention.

FIG. 4 is a block diagram which illustrates the processing functions that are associated with the ELP based pre-screen filter algorithm 305. As shown, the processing functions include an elliptical Laplacian kernel (ELK) 405, a peak detector 410 and a peak pixel location recording function 415. In accordance with a preferred embodiment of the present invention, each of these functions are implemented in software and/or firmware using well-known development techniques. However, as one skilled in the art will readily appreciate, some or all of these functions may be implemented in hardware.

Generally, the ELK 405 receives image data from an imaging sensor (e.g., thermal image data from a forward-looking infrared sensor). Typically, image data involves a matrix of picture elements known as pixels, where each pixel represents a value (e.g., image intensity value) at a corresponding position (e.g., an x-y coordinate position) in the image. The ELK 405 then down-samples the image one or more times, as explained in greater detail below. The ELK 405 also generates an appropriate elliptical Laplacian operator, which it then uses to process (i.e., filter) the original and one or more down-sampled images. This processing results in a vector (i.e., a set of values) for each of the original and one or more down-sampled images, where each value in a given vector reflects a level of correlation between the elliptical Laplacian operator and a corresponding pixel in a corresponding one of the original or down-sampled images, as well as a number of neighboring pixels surrounding the corresponding pixel. The peak detector 410 then processes each vector. This processing results in the identification of one or more peak values (assuming there are one or more candidate targets embedded in the image data) and the position (e.g., the x-y position) of each pixel associated with each of the one or more peak values. Assuming the peak value exceeds a predefined level, the location of the corresponding pixel is stored as the location of a corresponding candidate target by the peak pixel location recording function 415.

Figure 5:
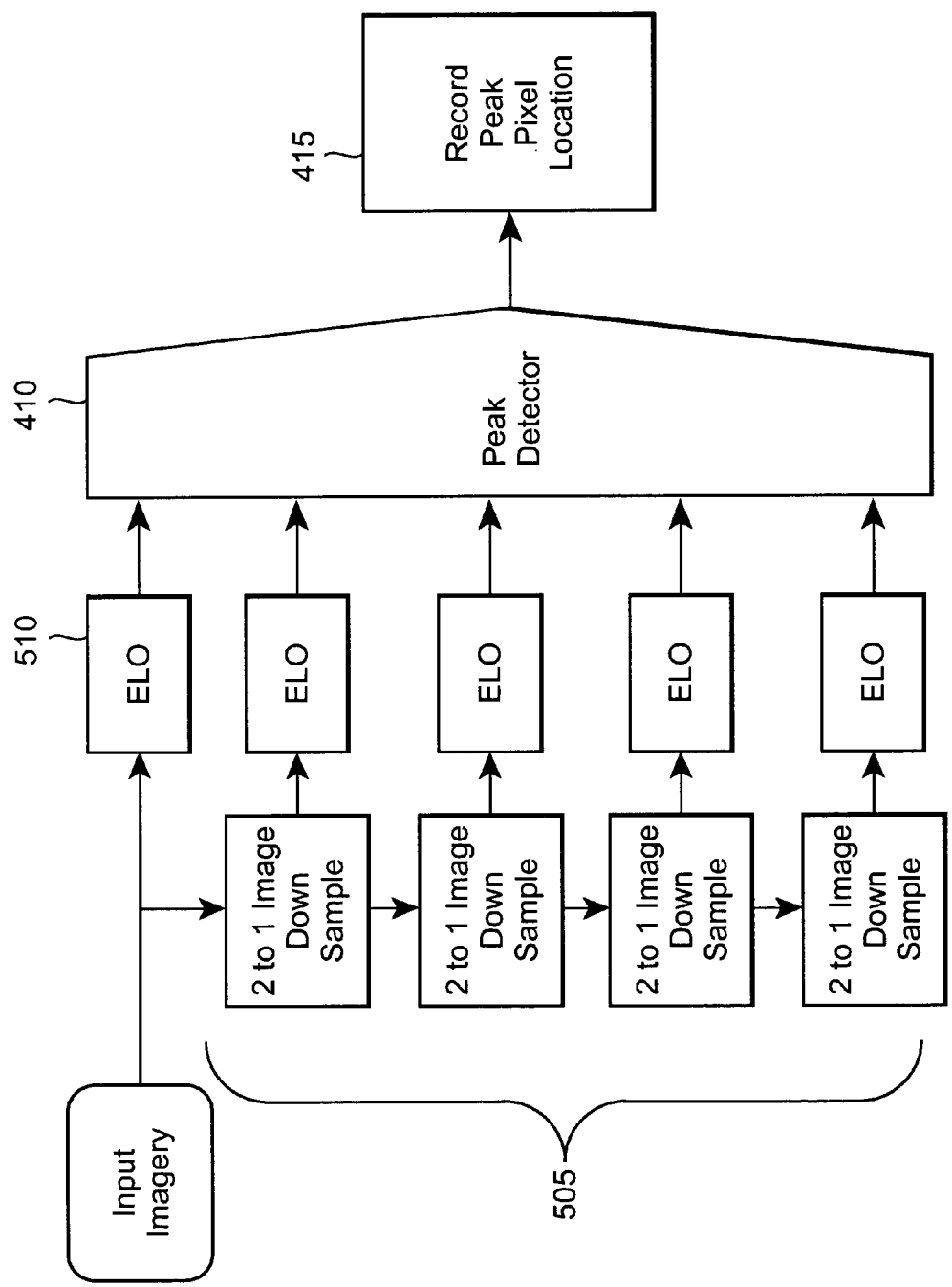
FIG. 5 is a block diagram which illustrates, in greater detail, the processing functions associated with the ELP based pre-screen filter algorithm, according to exemplary embodiments of the present invention.

FIG. 5 illustrates, in greater detail, the ELP based pre-screen filter 305 and, more particularly, the processing tasks associated with the ELK 405. As stated, the ELK 405 receives the image data. The image data is then down-sampled as shown by task 505. The data associated with the original image and each down-sampled image are then stored in memory. Down-sampling may involve a low-pass filtering process, whereby high frequency components are progressively removed from the image data. This may be achieved through decimation, whereby groups of adjacent pixels in the original image are averaged such that the resolution of the first down-sampled image is, for example, one-half that of the original image. The first down-sampled image may then be down-sampled in the same manner. The second down-sampled image would then have a resolution that is one-half that of the first down-sampled image. In a preferred embodiment, the down-sampling process continues until a pre-specified number of down-sampled images are obtained, where each subsequently generated down-sampled image has a progressively lower resolution than the image from which it was generated. If one were to picture the original image and all of the down-sampled images stacked in order, one on top of the other, with the highest resolution image on the bottom and the lowest resolution image on the top, one may think of the image stack in terms of a pyramid.

In accordance with one embodiment of the present invention, the ELK 405, after generating and storing the down-sampled images, processes (i.e., filters) the original image data and the data associated with each down-sampled image using an elliptical Laplacian operator (ELO), as shown by task 510. In an alternative embodiment, the ELK 405 may select, based on target range information (i.e., the distance between a prospective target and the image sensor), a number of images from amongst the original image and each of the down-sampled images, such that the size of any candidate target as it appears in the image data closely approximates the estimated size of the target given the aforementioned target range information. The ELK 405 then processes (i.e., filters) only the data associated with the selected images using the elliptical Laplacian operator. Target range information may be obtained through a variety of sources depending upon the nature of the weapon system. For example, target range information may be available through navigation equipment integral to or in communication with the weapon system, radar information or advanced intelligence. Prior to describing how the original image and/or one or more of the down-sampled images are processed (i.e., filtered) using an elliptical Laplacian operator, the manner in which the ELK 405 may generate the elliptical Laplacian operator is described.

Figure 6A:
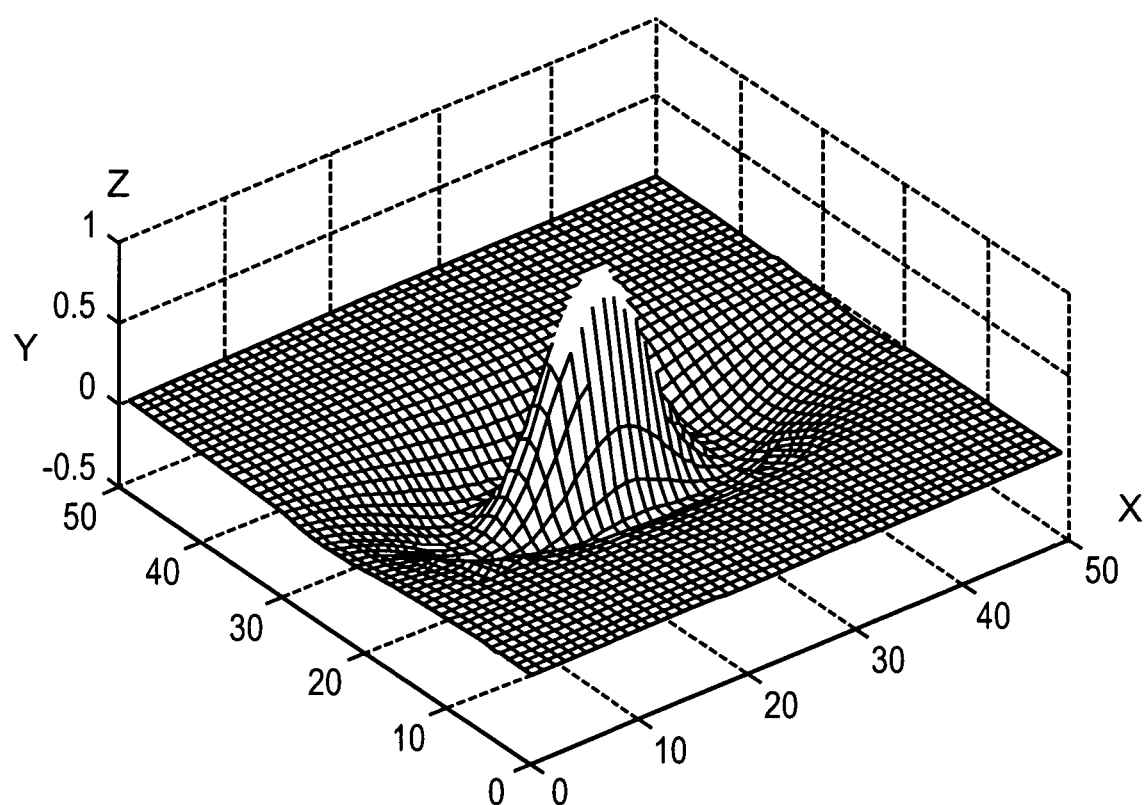
FIGS. 6A-6C are graphs which together illustrate an exemplary three-dimensional elliptical Laplacian operator.
Figure 6B:
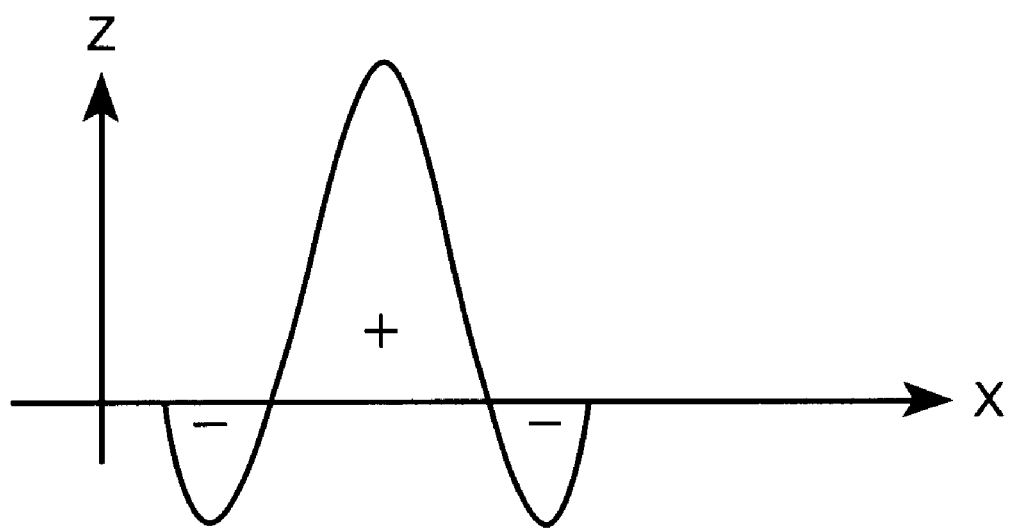
Figure 6C:
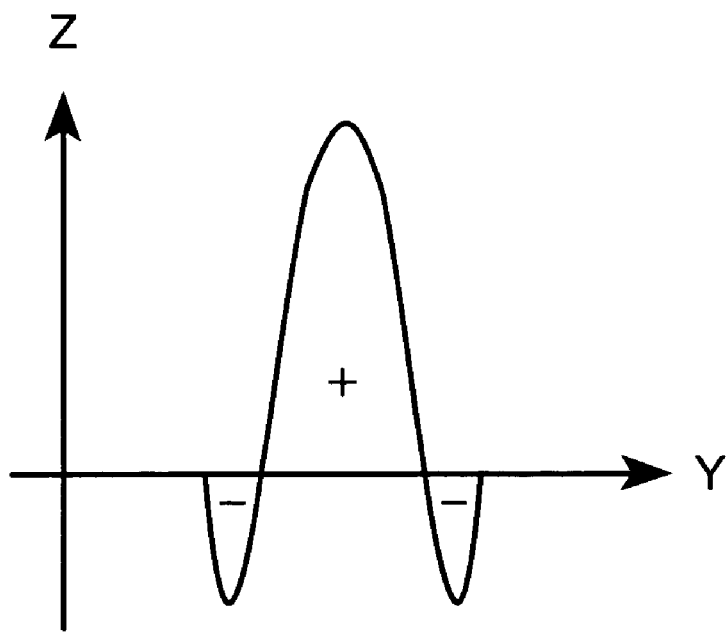

FIG. 6A illustrates an exemplary three-dimensional elliptical Laplacian operator. For purposes of illustration only, this elliptical Laplacian operator covers a 50×50 pixel area in the xy plane, where the values contained in each pixel represent the amplitude (i.e., the z direction values) of the operator. FIGS. 6B and 6C illustrate the amplitude of the operator in the xz and yz planes, along the major and minor axes of the elliptical operator, respectively. Again, the elliptical Laplacian operator shown in FIG. 6A is exemplary, and it will be understood that the amplitude and distribution will approximate the size and overall spatial characteristics of the expected target(s), as well as the level of contrast between the target(s) and the background imagery.

Figure 7A:
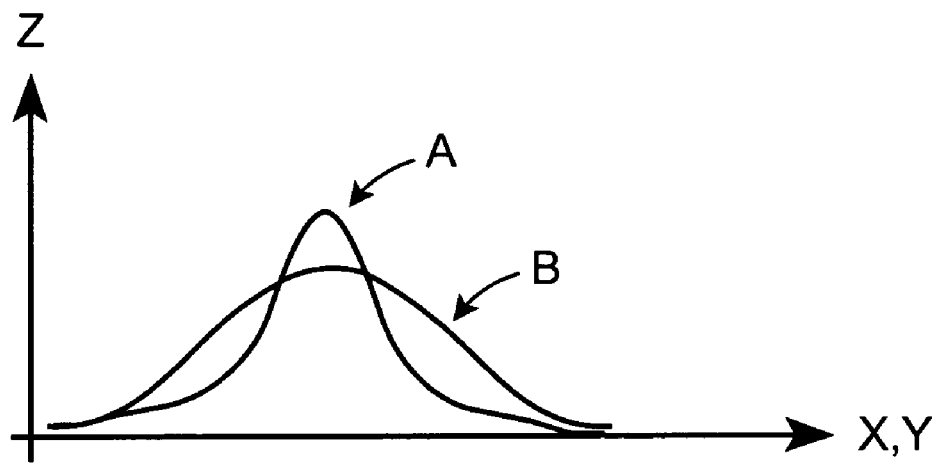
FIGS. 7A-7C are graphs which together illustrate an exemplary three-dimensional circular Laplacian and the generation thereof using two three-dimensional circular Gaussians.
Figure 7B:
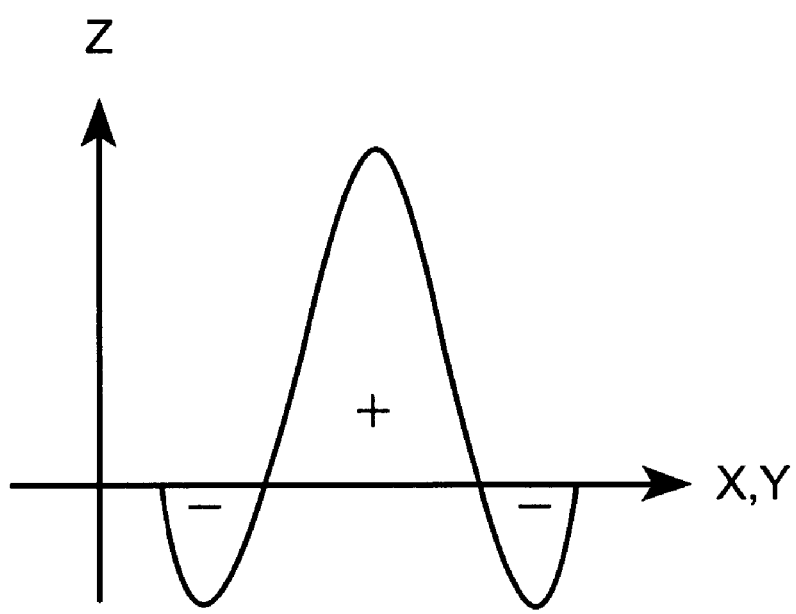
Figure 7C:
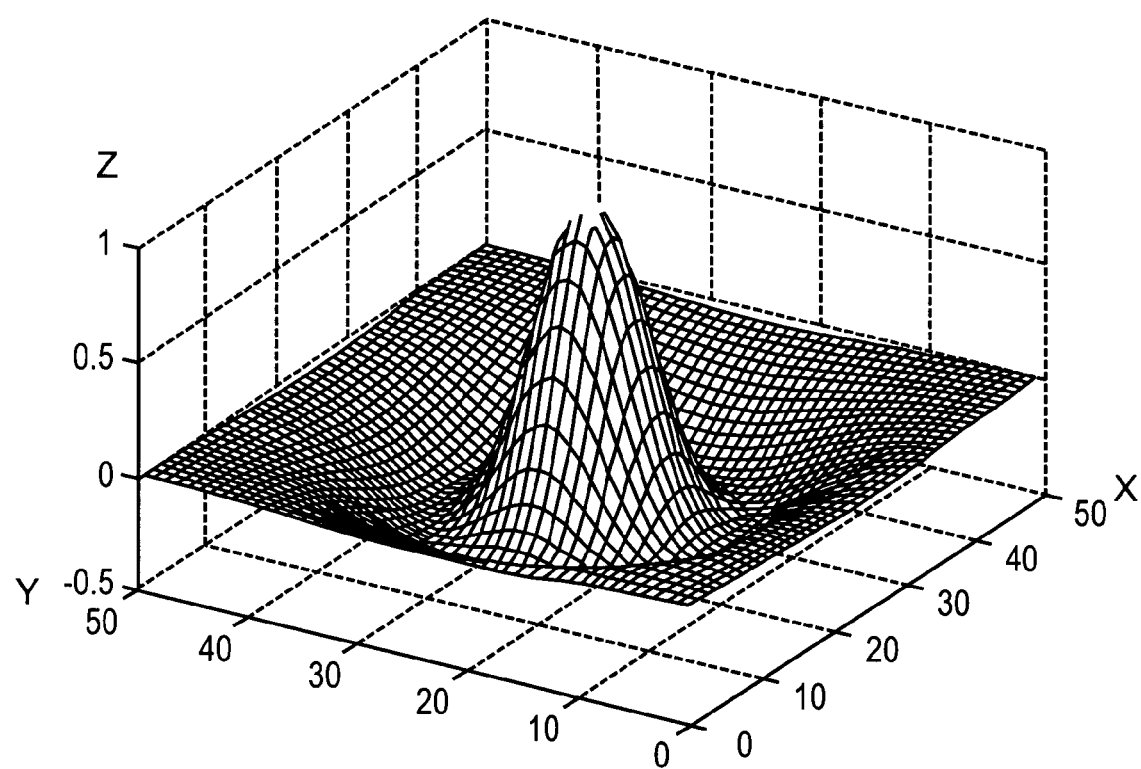

In a preferred embodiment of the present invention, the ELK 405 generates the elliptical Laplacian operator using a Difference of Gaussians (DOG) technique. A Gaussian is mathematical function that has a normal distribution. FIG. 7A illustrates two exemplary Gaussian functions, where Gaussian A has a greater amplitude than Gaussian B, but a smaller standard deviation (i.e., data spread about the mean value). In accordance with the DOG approach, subtracting Gaussian B from Gaussian A results in a Laplacian, for example, the Laplacian illustrated in FIG. 7B. If, as shown, Gaussian A and B are three-dimensional circular Gaussians, the resulting three-dimensional Laplacian will be circular as shown, for example, in FIG. 7C.

In accordance with one embodiment of the present invention, a Laplacian operator may be generated by subtracting one circular Gaussian from another, as explained above. The resulting circular Laplacian is then manipulated to achieve an elliptical Laplacian operator which closely matches the size, spatial characteristics and image intensity of prospective targets. However, in a preferred embodiment of the present invention, the Laplacian operator is generated, not by subtracting one circular Gaussian from another, but instead subtracting one elliptical Gaussian from another elliptical Gaussian. The resulting Laplacian will be elliptical.

In order to generate an elliptical Laplacian operator which matches the size, spatial characteristics and image intensity of prospective candidate targets, it is necessary to select appropriate Gaussians, such that the subtraction of one from the other results in the desired elliptical Laplacian operator.

As one skilled in the art will understand, a Gaussian may be represented by the following equation:

$$G(X) = \frac{1}{(2\pi)^{n/2}|\Sigma|^{1/2}} \exp[-1/2(X-M)^T \Sigma^{-1}(X-M)]$$

where X is a vector comprising, for example, xy coordinate values that define the Gaussian distribution in three-dimensional space; where M is a vector reflecting the mean value of vector X; where T is the symbol for transpose matrix; and where $\Sigma$ represents the standard deviation of Gaussian G(X). Further, standard deviation $\Sigma$ may be represented by the following covariance matrix:

$$\Sigma = \begin{bmatrix} \sigma_{11} & \sigma_{12} \\ \sigma_{21} & \sigma_{22} \end{bmatrix}$$

where $\sigma_{11}$ represents the distribution of the corresponding Gaussian along the x axis, $\sigma_{22}$ represents the distribution of the Gaussian along the y axis, and $\sigma_{12}$ and $\sigma_{21}$ represent the distribution of the Gaussian where the Gaussian has been rotated about the x and y axes respectively. The terms $\sigma_{11}$ and $\sigma_{22}$ are referred to as the auto-correlation terms, and if they are of equal value, the corresponding Gaussian is circular. If $\sigma_{11}$ and $\sigma_{22}$ are not of equal value, the corresponding Gaussian is elliptical. Thus, in order to generate an appropriate elliptical Laplacian operator, the values of $\sigma_{11}$ and $\sigma_{22}$ must be set accordingly.

The terms $\sigma_{12}$ the $\sigma_{21}$ are referred to as the cross-correlation terms. In addition to setting $\sigma_{11}$ and $\sigma_{22}$ to appropriate values, $\sigma_{12}$ and $\sigma_{21}$ must also be set to appropriate values. If $\sigma_{12}$ and $\sigma_{21}$ are both equal to zero, the corresponding Gaussian will be symmetric about the x and y axes. However, in order to accommodate an image sensor that is tilted with respect to the horizon, or more specifically, tilted with respect to the major axis of the prospective candidate target(s), the values for $\sigma_{12}$ and $\sigma_{21}$ should be selected so that the major axis of the resulting elliptical Laplacian operator is parallel to the horizon, where the major axis of the prospective candidate target(s) are parallel to the horizon, or more specifically, parallel to the major axis of the prospective targets themselves, where the major axis of the prospective candidate target(s) are parallel to neither the horizon or the image sensor.

The DOG is but one approach that may be employed for generating an elliptical Laplacian operator. Certainly, functions other than Gaussians may be used in a similar manner to generate an elliptical Laplacian operator, such as quadratic functions or sine waves. In fact, it is also possible to generate the desired elliptical Laplacian operator by brute force. That is, constructing the operator by defining all of its desired characteristics (e.g., major axis, minor axis, amplitude, standard deviation).

Regardless how the elliptical Laplacian operator is generated, the ELK 405 uses the operator to process (i.e., filter) each of the original and down-sampled images or, alternatively, a select number of these images based on target range. In a preferred embodiment, processing each image involves a convolution process. This may be achieved by overlaying the elliptical Laplacian operator atop a given pixel in a given image. For those images having higher resolutions, the size of the elliptical Laplacian operator will in all likelihood be larger than a single pixel. Thus, the elliptical Laplacian operator will overlay not only the given pixel but a number of neighboring pixels as well. The value of the given pixel, according to a typical convolution process, would be multiplied by the corresponding elliptical Laplacian operator value. Additionally, the value of each neighboring pixel covered by the operator are likewise multiplied by a corresponding value associated with the elliptical Laplacian operator. The multiplication values are then summed and averaged. The average value is then attributed to the given pixel. In general, this process is repeated for each pixel in each image (i.e., the original image and the down-sampled images) or, alternatively, each pixel in each of the images selected from amongst the original and down-sampled images based on target range. However, pixels located on the edge of an image or within a certain distance from the edge of an image, depending on the size of the elliptical Laplacian operator, may be excluded from the convolution process. When the one or more images have been processed using the elliptical Laplacian operator, the resulting vector (i.e., set of values) for each processed image is passed on to the peak detector 410, as shown in FIGS. 4 and 5.

For each resulting vector, the peak detector 410 scans the values and identifies a peak value. In a preferred embodiment, the peak value is compared to a threshold, where the threshold level may be a function of the image background, and more specifically, a predefined number of standard deviations above the mean image background value. If the peak value is greater than the threshold value, the peak value is attributed to a candidate target. If the peak value is not greater than the threshold value, it is assumed there is no distinguishable candidate target in that particular image. The position (e.g., the x-y position) of the pixel that corresponds with the peak value is stored by the record peak pixel location function 415. It should be noted that more than one peak value may be identified in a given image (i.e., in a given vector), particularly where more than one candidate target is embedded in the image data.

Referring back to FIG. 3, the image data and candidate target location information are passed to the Target delineator 310, which, as stated, establishes the extent of each candidate target. The feature extractor 315 then measures the various features associated with each candidate target and, based thereon, the target classifier 320 classifies each candidate target as a true target or a non-true target.

Figure 8:
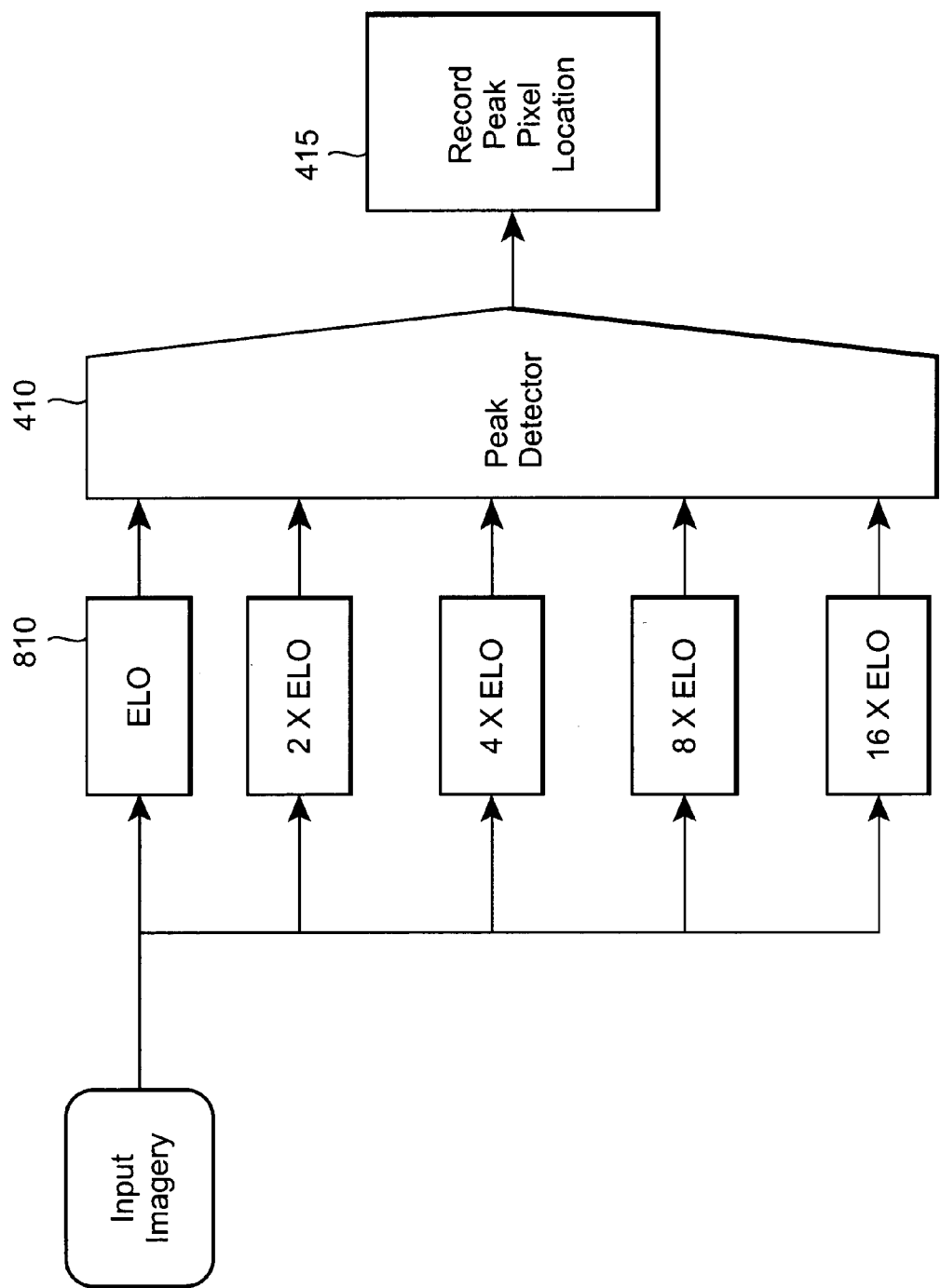
FIG. 8 is a block diagram which illustrates the processing functions associated with an alternative ELP based pre-screen filter algorithm, according to exemplary embodiments of the present invention.

FIG. 8 illustrates the processing tasks associated with an alternative ELP based pre-screen filter algorithm. In FIG. 5, the ELK 405 receives the image data. Per task 505, the image data is down-sampled. Then, per task 510, the ELO is used to process (i.e., filter) the input image and/or one or more down-sampled images. Alternatively, the input image may not be down-sampled. Instead, per task 810, the ELO may be enlarged. In FIG. 8, the ELO is progressively enlarged by a 2:1 ratio. It will be readily apparent, however, that the ELO may be enlarged using a ratio other than a 2:1 ratio. It will also be readily apparent that by processing (i.e., filtering) the input image with progressively larger ELOs, the $P_d$ associated with relatively large targets appearing in the input image increases.

Figure 9A:
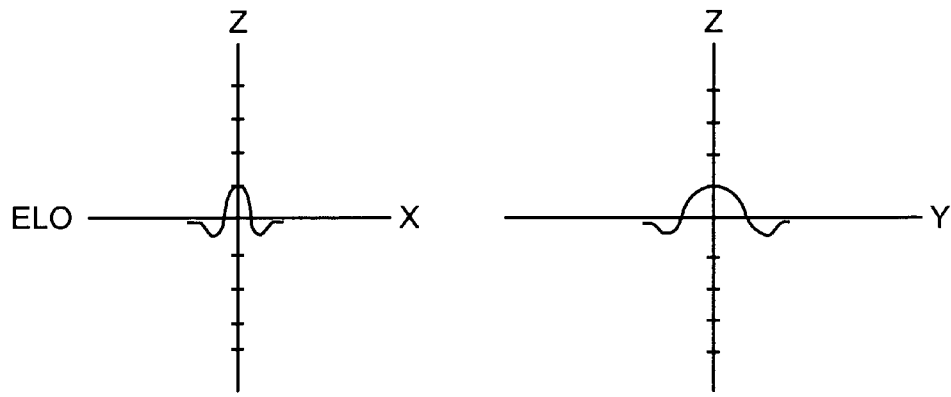
FIGS. 9A-9C are graphs which illustrate the process of progressively enlarging the elliptical Laplacian operator used in processing an image in accordance with the alternative ELP based pre-screen filter algorithm of FIG. 8.
Figure 9B:
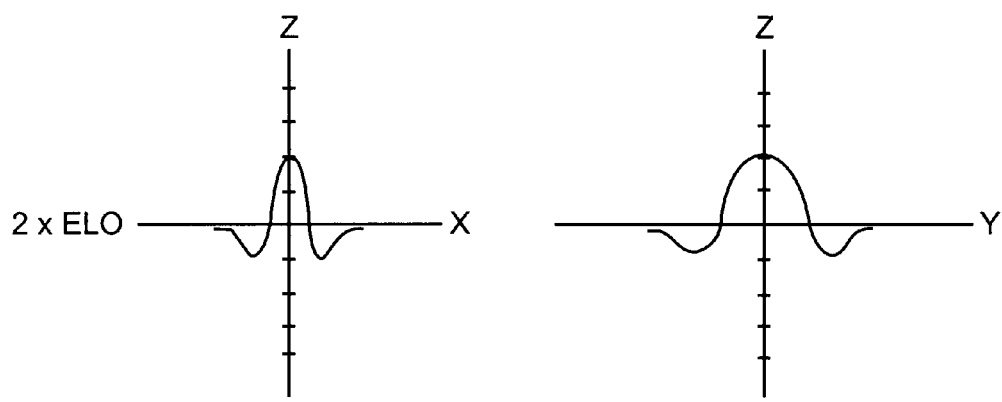
Figure 9C:
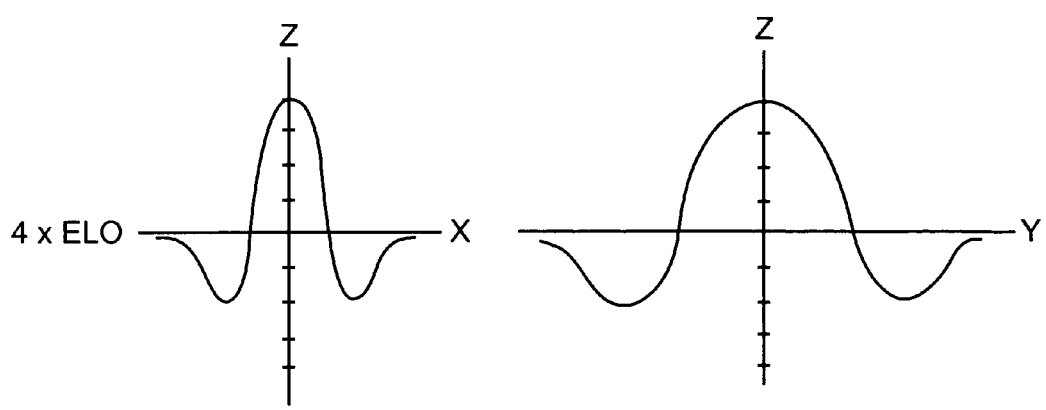

FIGS. 9A-C illustrate the concept of progressively enlarging the ELO, per task 810. If, for example, FIG. 9A reflects the ELO, FIG. 9B reflects the larger 2×ELO. Likewise, FIG. 9C reflects the even larger 4×ELO.

Since numerous additional modifications and alternative embodiments of the invention will be apparent to those skilled in the art in view of the foregoing description, the above description is to be construed as illustrative only, and is for the purpose of teaching those skilled in the art the best mode of carrying out the invention. The details of the present invention described above may be varied substantially without departing from the spirit of the invention, and the exclusive use of any modification which comes within the scope of the appended claims is reserved.

The invention claimed is:

1. A method for identifying an object in an image comprising the steps of:
   processing the image with an elliptical Laplacian operator;
   down-sampling the image at least once, wherein the image has a first resolution and each down-sampled image has a resolution that is less than the resolution of the image from which it is down-sampled;
   processing at least one down-sampled image with the elliptical Laplacian operator;
   locating a peak value in the processed image and the processed down-sampled image; and
   identifying an object as a function of the peak value in the processed image and processed down-sampled image.

2. The method of claim 1 further comprising the step of:
   identifying an object as a function of the peak value in one or more of the down-sampled images.

3. The method of claim 1, further comprising the steps of:
   selecting one or more images from amongst the image and any down-sampled image;
   processing each of the selected images with the elliptical Laplacian operator;
   locating a peak value in each of the selected images; and
   identifying the object as a function of the peak value in one or more of the selected images.

4. The method of claim 1 further comprising the step of:
   generating the elliptical Laplacian operator.

5. The method of claim 4, wherein the elliptical Laplacian operator is generated using two Gaussians.

6. The method of claim 5, wherein the two Gaussians are elliptical Gaussians.

7. The method of claim 4, wherein the elliptical Laplacian operator is generated such that the elliptical Laplacian operator exhibits characteristics that reflect expected objects.

8. A method for locating a target in an image comprising the steps of:
   down-sampling the image one or more times, wherein the image has a first resolution and each of the one or more down-sampled images has a resolution that is less than the resolution of the image from which it was down-sampled;
   selecting one or more of the down-sampled images;
   processing pixel data associated with the selected images and pixel data associated with the image using the elliptical Laplacian operator;
   generating a vector comprising a set of resultant values for the processed image and for each of the selected images based on said step of processing the pixel data;
   identifying a peak value from the set of resultant values for each vector; and
   locating the target as a function of a pixel location corresponding with the identified peak value for the vector corresponding to the processed image and one or more of the selected down-sampled images.

9. The method of claim 8 where the resultant values are a function of the processing of the pixel data associated with the selected images.

10. The method of claim 8, wherein said step of processing the pixel data associated with the image using an elliptical Laplacian operator comprises the step of:
   convolving the elliptical Laplacian operator with each of a number of pixels in the image.

11. The method of claim 8 further comprising the step of:
   generating the elliptical Laplacian operator using a difference of two Gaussians.

12. The method of claim 11, wherein the two Gaussians are elliptical Gaussians.

13. The method of claim 11, wherein the elliptical Laplacian operator is generated such that the elliptical Laplacian operator exhibits characteristics that reflect those of a prospective target.

14. The method of claim 11, wherein the elliptical Laplacian operator is generated such that the elliptical Laplacian operator is oriented in a manner that reflects an expected orientation of a prospective target.

15. A target recognition system comprising:
   means for receiving data associated with an image;
   an elliptical Laplacian based pre-screen filter for processing the image data and for identifying therein a candidate target, wherein the elliptical Laplacian based pre-screen filter comprises:
   means for down-sampling said image one or more times, wherein said image has a first resolution and each of the one or more down-sampled images has a resolution that is less than the resolution of the image from which it was down-sampled;
   means for selecting one or more of the down-sampled images for processing and identifying in the selected one or more down-sampled images a candidate target;
   means for processing the pixels using an elliptical Laplacian operator;
   means for generating a vector which comprises a set of resultant values, where each resultant value reflects the processing of a corresponding pixel;
   means for identifying a peak value from the set of resultant values; and
   means for locating the candidate target as a function of a position within the image of the pixel that corresponds with the identified peak value;
   means for processing pixels associated with the selected images using the elliptical Laplacian operator;
   for each selected image, means for generating a vector comprising a set of resultant values, where each resultant value reflects the processing of a corresponding pixel in a corresponding, selected image;
   means for identifying a peak value for each vector associated with a selected image; and
   means for locating the candidate target as a function of a pixel position corresponding with the peak value identified in one or more of the selected images.

16. The system of claim 15, wherein said means for selecting one or more of the down-sampled images comprises:
   means for selecting the one or more down-sampled images based on an expected target range.

17. The system of claim 15, wherein said elliptical Laplacian pre-screen filter further comprises:
   means for comparing the identified peak value to a threshold value, wherein the threshold value is a function of image background values.

18. The system of claim 15 further comprising:
   a target delineator;
   a feature extractor; and
   a target classifier.

* * * * *